United States Patent Office 3,427,255
Patented Feb. 11, 1969

3,427,255
FLUID COMPOSITIONS FROM MALEIC ANHYDRIDE AND CARBOXYL-TERMINATED COMPOSITIONS
Leslie C. Case, 14 Lockeland Road, Winchester, Mass. 01890
No Drawing. Filed Nov. 15, 1966, Ser. No. 594,382
U.S. Cl. 252—426
Int. Cl. C08g 30/12
9 Claims

ABSTRACT OF THE DISCLOSURE

Homogeneous compositions prepared by admixture of maleic anhydride and compositions having terminal carboxylic acid groups are described. These compositions are fluid and readily miscible with other materials at room temperature and are particularly suitable as cross-linking agents for epoxy resins.

---

This invention is concerned with fluid polymeric intermediates suitable as curing agents for epoxy resins. More specifically, this invention is concerned with fluid polymers having carboxylic acid end groups, and with solutions of cyclic anhydrides in carboxyl-terminated polyethers and polyesters.

Polyepoxides are readily cross-linked to useful thermoset resins by materials known as curing agents or hardeners. Curing agents described in the art comprise a multitude of compositions, such as amines, polycarboxylic acids and their anhydrides, polyesters, imidazoles, dicyandiamide and borates. Many of these known curing agents possess one or several undesirable features, such as: toxicity; high cost; imparting adverse properties to the final resin; being of a solid, or highly viscous, nature at room temperature which requires the application of heat, or the use of a liquid solvent for transformation into a state of ready miscibility with the epoxide; short pot life, e.g. too short a time span after mixing with the polyepoxide before the cure has progressed to an extent which prevents handling of the reaction mixture; volatility; and others.

It is an object of the present invention to provide stable, inexpensive, non-volatile, innocuous curing agents which are fluid and readily miscible at room temperature with polyepoxides and which result in hard cured resins with excellent physical, chemical and electrical properties. It is a further object of the invention to provide a method to decrease the viscosity of acid-terminated polyesters and polyester-ethers.

According to one embodiment of the invention, it has been found that difunctional, linear polymers within a specific molecular weight range and having carboxylic acid end groups possess viscosities at or near room temperature which allow ready miscibility with polyepoxides, and that such mixtures can be cured to hard resins with superior heat distortion temperatures. According to a second embodiment of the invention it has further been discovered that, surprisingly and unexpectedly, solid maleic anhydride and highly viscous, or glassy, carboxylic-acid terminated polymers of the group consisting of polyesters and polyethers with terminal carboxylic acid end groups may be combined to form homogeneous fluid compositions having viscosities which are very much lower than those of the pure acid-terminated polymers, and that such mixtures are excellent inexpensive curing agents readily miscible at room temperature with polyepoxides and curable to hard, cross-linked resins.

The linear, difunctional carboxylic-acid terminated fluid polymers of the present invention have viscosities of less than 1,000,000 centipoises at 25° C. and are of the general formula

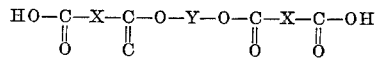

wherein X is a hydrocarbon radical selected from the group consisting of saturated and unsaturated aliphatic, cycloaliphatic and aromatic hydrocarbon radicals and Y is an aliphatic radical selected from the group consisting of lower aliphatic alkylene radicals and polyoxyalkylene radicals. Desirable compositions are acid-terminated polyethers having the general formula

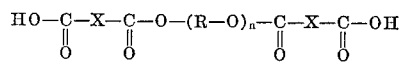

in which X is selected from the group consisting of 1,2-ethylene, 1,2-ethenylene, e.g. —CH=CH—, 1,2-cyclohexylene, 1,2-phenylene, 3,4,5,6-tetrahydro-1,2-phenylene, 3,4,5,6-tetrachloro-1,2-phenylene, 3,4,5,6-tetrabromo-1,2-phenylene, and 1,4,5,6,7,7-hexachloro-(2,2,1)-bicyclo-2,3-heptenylene-5, R is a lower aliphatic 1,2-alkylene radical selected from the group consisting of 1,2-ethylene, 1,2-propylene and 1,2-butylene, and $n$ is an integer having a value of at least one and generally not more than about ten, the average value of $n$ ranging from two to seven. Particularly preferred compositions are those in which X is —CH=CH—, R is 1,2-ethylene and $n$ has an average value ranging from two to four, and compositions in which X is 1,2-phenylene, R is 1,2-ethylene, and $n$ has an average value ranging from about four to seven.

The carboxylic acid-terminated polymers are desirably prepared by reacting in intimate admixture a cyclic organic polycarboxylic acid anhydride with aliphatic alcohols having two hydroxyl groups, e.g. glycols, or diols, of average molecular weight of at least 100 and generally not more than 400. In order to prepare the fluid compositions having viscosities within the scope of the invention it is an essential requirement that this reaction be carried out at temperatures lower than those at which the reaction between carboxylic acid groups and hydroxyl groups to form water and ester linkages, e.g., the polycondensation reaction, proceeds at any appreciable rate. The reaction is advisably conducted at a temperature high enough for the anhydride to have an appreciable solubility in the glycol but low enough to essentially avoid any polycondensation reaction. Suitable temperaturers will vary from about 80° C. to not more than 180° C., and reaction temperatures within a range of about 120° C. to 160° C. are usually preferred.

Useful anhydrides are the cyclic anhydrides of organic polycarboxylic acids, and preferably organic dicarboxylic acids having from four to nine carbon atoms and from zero to six halogen substituents of the group consisting of chloro and bromo radicals, and characterized by the formula

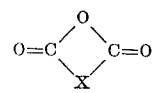

wherein X is identical with the hydrocarbon radical X attached to the two carboxylic carbonyl groups in a polycarboxylic acid of the formula

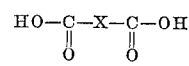

Representative suitable anhydrides are maleic anhydride, succinic anhydride, chloromaleic anhydride, dichloromaleic anhydride, phthalic anhydride, 3,4,5,6-tetrahydrophthalic anhydride, 3,4,5,6-tetrachlorophthalic anhydride, 3,4,5,6-tetrabromophthalic anhydride, and 1,4,5,6,7,7-hexachloro-(2,2,1)-5-heptene-2,3-dicarboxylic acid anhydride, hereinafter referred to as chlorendic anhydride. Mixtures of anhydrides may be employed, and such mixtures are desirably utilized to obtain lowered melting points and greater solubility of the anhydride mixture in the glycol.

Useful glycols comprise the group consisting of aliphatic alkylene glycols and polyoxyalkylene glycols such as polyoxyethylene glycols, polyoxy-1,2-propylene glycols and polyoxy-1,2-butylene glycols. In order to be suitable for use in preparing the compositions of the present invention the average molecular weight of the glycol employed should range from about 100 to about 400. The average molecular weight is the molecular weight computed by dividing the total weight by the number of molecules in a mixture and should not be confused with the individual molecular weight of composition in which all molecules have identical molecular weights. Thus, glycols with individual molecular weights outside the range of the average molecular weight limits may be employed in mixtures having the appropriate average molecular weight. In order to prepare desirable compositions it is essential that the glycols employed have average molecular weights within the range specified herein-above. If glycols with average molecular weights below those of the above-specified critical limits are used the viscosities of the acid-terminated polymers are undesirably large for the purpose of this invention. If glycols with average molecular weights above those specified herein-above are employed the acid-terminated compositions are not suitable for the preparation of hard, tough cross-linked resins with desirable heat distortion temperatures, but instead result in soft, flexible cross-linked compositions when reacted with polyepoxides.

Examples of useful glycols include ethylene glycol, propylene glycol, 1,2-butylene glycol, 1,3-butylene glycol, 1,4-butylene glycol, 1,5-pentanediol, diethylene glycol, triethylene glycol, tetraethylene glycol, dipropylene glycol, tripropylene glycol, dibutylene glycol, and others. Those glycols which possess molecular weights in the lower portion of the suitable molecular weight range, e.g. from 100 to about 200, are preferably used with aliphatic anhydrides, particularly with maleic anhydride, while glycols having average molecular weights around 300 to 400 are advisably employed with anhydrides containing cyclic hydrocarbon radicals, in particular aromatic anhydrides, such as phthalic anhydride. The preferred compositions are those prepared from maleic anhydride and polyoxyethylene glycols ranging in average molecular weight from 106 and preferably from 150 to about 200 and those prepared from phthalic anhydride and polyoxyethylene glycols ranging in average molecular weight from 200 to 300. These two compositions are preferred because they advantageously combine desirable viscosity characteristics with excellent hardness and heat-distortion temperatures of the cured resins prepared therefrom.

In order to prepare the compositions of the present invention it is essential that the ratio of moles of anhydride to moles of polyoxyalkylene glycol employed be at least 2.0. Molar ratios of cyclic anhydride to polyoxyalkylene glycol will generally vary from at least 2.0 to about 2.5. Higher ratios may be employed since solutions of anhydrides in acid-terminated polyethers are frequently desirable.

The difunctional carboxylic acid-terminated polymers of the present invention are light-colored fluid compositions. The acid number of these compositions, that is, the milligrams of potassium hydroxide equivalent to one gram of polymer, will generally range from about 75 to about 280 with the preferred range varying from 100 to 225. The hydroxyl number of these compositions should be low, and desirably should be less than 10 percent of the respective acid number. Quite surprisingly, the viscosities of these acid-terminated polymers are less than 1,000,000 centipoises, and frequently less than 500,000 centipoises at 25° C. The viscosities of the preferred acid-terminated compositions derived from aromatic cyclic dicarboxylic acid anhydrides will generally be less than 750,000, and frequently will be less than 500,000 centipoises. Viscosities of compositions derived from maleic anhydride will generally be less than 500,000 centipoises, and frequently less than 50,000 centipoises at 25° C. The relatively low viscosities of these materials are quite unexpected and surprising in view of the extremely viscous, and often glassy nature of carboxylic acid-terminated polyesters known to the art, and in particular of those derived from phthalic anhydride and substituted phthalic anhydrides. These fluid compositions of the present invention are in sharp contrast to the solid and semisolid acidic polyesters described in the art as cross-linking agents for epoxy resins (see, for example, U.S. Patent 2,683,131).

When used in cross-linking applications, the fluid acid-terminated polymers described herein-above may be used alone or in homogeneous admixture with one, or with several, cyclic organic dicarboxylic acid anhydrides having from four to twelve carbon atoms and from zero to six halogen radicals of the group consisting of chloro and bromo radicals. The solubility of these various cyclic anhydrides in the acid-terminated polymers has been found to vary considerably and the anhydrides are advisably admixed in amounts low enough to form a homogeneous solution. Maleic anhydride, methyl-(2,2,1)-5-heptene-2,3-dicarboxylic acid anhydride (hereinafter referred to as methyl nadic anhydride) hexahydrophthalic anhydride, and dodecenyl succinic anhydride have been found to be very soluble. Examples of other anhydrides which have appreciable solubility are chlorendic anhydride, chloromaleic anhydride, and dichloromaleic anhydride. Other anhydrides, such as tetrachlorophthalic, tetrabromophthalic, and tetrahydrophthalic anhydrides have low solubilities. Phthalic anhydride and succinic anhydride have been found to have quite low solubilities. Moreover, it has been found that homogeneous admixtures of cyclic anhydrides and carboxylic-acid-terminated polymers have different viscosities from those of the constituent acid-terminated polymers alone. A significant viscosity increase is observed with most anhydrides. Two notable exceptions are hexahydrophthalic anhydride and maleic anhydride. Admixture of maleic anhydride, in particular, has been found to result in compositions having dramatically reduced viscosities. Thus, in choosing the amount and nature of anhydride to be employed in admixture, two principal factors have to be considered, the solubility as well as the resulting change in viscosity. Suitable compositions may contain as much as 75 percent by weight of an easily soluble anhydride such as maleic anhydride, methyl nadic anhydride, hexahydrophthalic anhydride, or dodecenyl succinic anhydride. Other anhydrides, such as tetrachlorophthalic, tetrabromophthalic, chlorendic, tetrahydrophthalic, and phthalic, may be admixed in amounts of not more than about ten percent by weight, and frequently not more than about 5 percent by weight of the total solution.

In a second embodiment of the present invention, fluid, homogeneous acidic compositions of low viscosity and ready miscibility at room temperature are provided from maleic anhydride and carboxylic acid-terminated polymers selected from the group consisting of acid-terminated polyesters and acid-terminated polyether-esters having equivalent weights ranging from 130 to 1000 and having from two to four carboxylic acid groups per molecule, e.g. having a functionality from two to four, and having acid numbers ranging from 56 to 430.

The fluid homogeneous acidic compositions are obtained by combining maleic anhydride and the carboxylic acid-terminated polymer in appropriate amounts and heating the components, advisably with agitation, until a clear, homogeneous, intimately admixed composition is obtained which retains these properties on being cooled to room temperature. It is not known whether the homogeneous fluid curing agents so obtained consist merely of a solution of maleic anhydride in the polymer, or whether chemical interchanges, such as partial linear anhydride formation at the chain ends, take place in the preparation of these binary fluid curing agents. Admixture of as little as one percent by weight of maleic anhydride has been found effective in dramatically lowering the viscosity of a highly viscous carboxylic-acid-terminated polymer to a level which permits handling and mixing at room temperature. Addition of approximately 10 to 15 percent by weight of maleic anhydride, based on the total weight of polymer plus anhydride mixture, decreases the polymer viscosity by a factor of about ten.

The amount of maleic anhydride which is generally employed in combination with the carboxylic-acid-terminated polymers in preparing the fluid, homogeneous compositions may range from about one percent by weight, based on the weight of the polymer-anhydride mixture, and preferably at least about two percent by weight, up to about 75 percent by weight of the total mixture. The most useful range of proportions will vary from about five percent to about 50 percent by weight of the total mixture of acid-terminated polymer plus anhydride.

Useful carboxylic acid-terminated polyesters and polyether-esters include a wide variety of compositions.

One useful class consists of the difunctional acid-terminated polyethers of the general formula

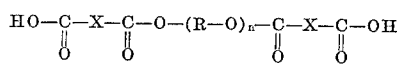

wherein X is a hydrocarbon radical identical with the radical X in a polycarboxylic acid of the formula

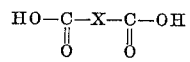

R is a 1,2-alkylene radical identical with the 1,2-alkylene radical in a polyoxyalkylene glycol of the formula

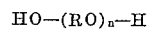

and $n$ is an integer having a value of at least one and having an average value ranging from about two to about ten. Preferred compositions are those in which X is selected from the group consisting of ethenylene,
1,2-phenylene,
3,4,5,6-tetrachloro-1,2-phenylene,
3,4,5,6-tetrabromo-1,2-phenylene,
3,4,5,6-tetrahydro-1,2-phenylene, and
1,4,5,6,7,7-hexachloro-(2,2,1)-bicyclo-2,3-heptenylene-5, R is selected from the group consisting of 1,2-ethylene, 1,2-propylene, and 1,2-butylene and is identical with the R in a polyoxyalkylene glycol $HO(R'O)_nH$ of the group consisting of polyoxyethylene glycol, polyoxy-1,2-propylene glycol, and polyoxy-1,2-butylene glycol of molecular weight ranging from at least 62 to not more than about 1000. The preparation of such compositions is advisably carried out by the method described herein above for the preparation of the fluid acid-terminated polymers of this invention.

Representative of other very useful acid-terminated compositions for use in combination with maleic anhydride are those prepared from cyclic ethers, in particular epoxides, and cyclic anhydrides. Particularly preferred are compositions prepared from epoxides, cyclic anhydrides and a polymerization starter of the group consisting of water, hydrogen sulfide, and organic compounds with active-hydrogen-containing radicals of the group consisting of hydroxyl radicals, carboxylic acid radicals, and sulfhydryl radicals, and having the general formula:

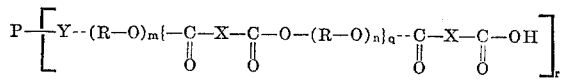

wherein Z is an atom selected from the group consisting of oxygen and sulfur, $f$ is the functionality of the polymer and has a value of at least two and generally not more than four and P is identical with the residue P in a polymerization starter $P(ZH)_f$ selected from the group specified hereinabove, X and R have the previously assigned meanings, $m$ is an integer with a value varying from zero to about 10 and $n$ is an integer having a value of at least one and generally not more than 10, with the average value of $n$ ranging from about 1.5 to about 3.0, and $q$ is an integer varying from 0 to about 5, and having an average value of at least about 0.1. The preparation of these polymers is described in U.S. Patent 3,280,077 and in application Ser. No. 456,816, filed May 18, 1965, now abandoned.

Also of use are polyesters prepared by conventional polycondensation techniques from a polycarboxylic acid or its anhydride, a glycol and a polyhydroxy compound by bringing these reactants together in intimate admixture, and then heating the mixture at an elevated temperature of about 150 to 250° C. for as long as necessary and distilling off the water of condensation as it is formed while preferably maintaining a sparge of inert gas, such as nitrogen, argon, or carbon dioxide. Examples of reactants employed in the preparation of such polyesters are phthalic anhydride, chlorednic anhydride, tetrachlorophthalic anhydride, tetrahydrophthalic anhydride, tetrabromophthalic anhydride, ethylene glycol, diethylene glycol, triethylene glycol, propylene glycol, dipropylene glycol, butylene glycol, 1,5-pentanediol, 1,4-butanediol, glycerol, 1,2,6-hexanetriol, pentaerythritol, trimethylolpropane, trimethylolethane, and the like.

Other anhydrides, such as chlorendic anhydride, chloromaleic anhydride, and dichloromaleic anhydride have been found to be soluble in the fluid compositions derived from maleic anhydride and carboxylic acid-terminated polymers and may be used in admixture therewith. The proportion of these anhydrides which may be employed will usually vary from about 5 percent to about 75 percent, and preferably to about 50 percent by weight based on the weight of the total composition. A particularly desirable combination consists of maleic anhydride, an acid-terminated polymer and up to 50 percent by weight of chlorendic anhydride based on the weight of the total composition. Another particularly desirable composition might contain up to 50 percent by weight of the chlorendic, chloromaleic, or dichloromaleic anhydride, in combination with from 0–25 percent by weight, based on the weight of the total composition, of maleic, hexahydrophthalic, methyl nadic or dodecenyl succinic anhydride.

The less soluble anhydrides, such as tetrachlorophthalic, tetrabromophthalic, phthalic, and tetrahydrophthalic, may be incorporated into the maleic anhydride-acidic polymer mixture in amounts of up to about 10 percent by weight based on the weight of the total composition in place of one of the more soluble anhydrides. For example, a suitable composition might include 5 percent tetrabromophthalic anhydride, 20 percent chlorendic anhydride, and 15 percent maleic anhydride.

A specific formulation useful for flame-retardant compositions would include from 0 to 10 percent tetrachlorophthalic anhydride, 0 to 10 percent tetrabromophthalic anhydride, from 0 to 50 percent of an anhydride selected from chlorendic, chloromaleic, and dichloromaleic anhydrides, from 0 to 25 percent maleic anhydride, with the total anhydride content being in the range of from about 20 to not more than 75 percent by weight, with the remainder consisting of the carboxylic-acid-terminated polymer.

The fluid compositions of the present invention are very useful in cross-linking, e.g. curing, polyfunctional cyclic ethers, cyclic thioethers, and cyclic imines, also known as aziridines. The compositions of the present invention are particularly useful in curing polyepoxides, that is compounds possessing more than one epoxy group, e.g. more than one group of the structure

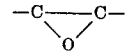

per molecule. The fluid nature of the compositions of the present invention allows intimate admixture at room temperature with the polyepoxide to be cured. The resulting fluid curable mixtures are especially suitable for applications which require a relatively low viscosity, such as for casting in thin sections, or for wetting of fibrous reinforcement. Since the mixing of the curing agent and the component to be cured is readily accomplished at room temperature, the necessity of heated mixing tanks is eliminated when the compositions of the present invention are employed. The room temperature miscibility also advantageously results in an increased pot life. Another desirable advantage of the compositions of the present invention is their lack of volatility and reduced toxicity. When reacted with polyepoxides the fluid curing agents of the present invention possess the totally unexpected and very valuable characteristic that they produce hard, tough resins having high heat-distortion temperatures.

Polyepoxides which can be used in combination with the instant compositions include all those which are reactive towards carboxylic acids or anhydride curing agents. The polyepoxides may be monomeric or polymeric and they may be saturated or unsaturated aliphatic, cycloaliphatic, aromatic or heterocyclic and may possess substituents such as hydroxyl groups, halogen radicals, ether radicals, carbalkoxy radicals and the like. Examples of suitable polyepoxides include among others the various condensation products of halohydrins with polyhydric phenols, especially of epichlorohydrin with 2,2-bis(4-hydroxyphenyl) propane, the so-called epoxy resins of commerce, such as the diglycidyl ether of 2,2-bis(4-hydroxyphenyl) propane, the diglycidyl ether of bis(4-hydroxyphenyl) methane, glycidyl ethers of tris(hydroxyphenyl) propane and tetrakis(hydroxyphenyl) ethane; the condensation products of epichlorohydrin with phenol-formaldehyde resins and with glycerol, such as the glycidyl ethers of glycerol; the epoxidized products derived from olefinically unsaturated compounds by epoxidation, that is, epoxidized polyolefins such as butadiene diepoxide, vinylcyclohexane diepoxide, and dicyclopentadiene diepoxide, epoxidized polymers and copolymers of diolefines, such as polybutadiene polyepoxides, epoxidized esters of polyethylenically unsaturated acids and epoxidized esters of ethylenically unsaturated alcohols and unsaturated carboxylic acids, such as 9,10-epoxystearyl 9,10-epoxystearate, and 3,4-epoxymethylcyclohexyl-3,4-epoxymethylcyclohexylcarboxylate; and epoxidized natural oils such as epoxidized linseed oil, soybean oil, perilla oil, tung oil, and dehydrated castor oil, and also trivernolin.

In utilizing the compositions of the present invention as curing agents for polyepoxides, standard methods and techniques known to the art, such as for example those described in Lee and Neville, "Epoxy Resins, Their Application and Technology," McGraw-Hill Co., 1957, are employed. Cross-linked compositions are prepared by intimately admixing the instant curing agents and the polyepoxide and allowing the mixture to cure at a temperature varying from room temperature to about 200° C. The time required to effect a cure will vary from about one hour at elevated temperatures to several days at room temperature. Conventional catalysts known to the art may be used as warranted to assist the rate of cure. Suitable catalysts are various amines, such as diethylene triamine, dimethyl benzylamine, and the dimethylaminomethyl phenols, which are particularly useful, and Lewis acids, such as boron trifluoride. Also useful are various metal compounds, such as stannous salts, zinc salts, and cobalt salts of carboxylic acids and aluminum, boron, and titanium esters of alcohols. The catalysts may be employed in an amount of from about 0.01% up to about 10% of the total mixture, with about 0.05% to 5% being the preferred range. Known additives, accelerators, modifiers, and fillers may be admixed and employed as desired. The polyepoxide is used in an amount of from about 1 to 3 equivalents of epoxide, that is, 1 to 3 mols of

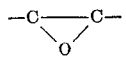

group per sum of (equivalents of acid end groups plus mols of free anhydride) present in the polymeric curing agent. The preferred value of this ratio is about 1.5 to about 2.5.

Cross-linked resins prepared from the instant curing agents possess excellent hardness at room temperature and superior heat-distortion temperatures. For example, the cured compositions prepared from bisphenol A-diglycidyl ether and the curing agents of the present invention have heat distortion temperatures of at least 100° C. and have Shore A hardness values at 125° C. in excess of 30 and frequently in excess of 50. By comparison, a casting prepared under the same conditions as a reference standard, using phthalic anhydride and bisphenol A-diglycidyl ether had a Shore A hardness of only 28 at 125° C. The Shore A hardness values at 25° C. of castings cured with the instant curing agents generally exceed 90 and frequently are above 95. The excellent hardness and high heat-distortion temperature of the cured resins which results when the compositions of the present invention are employed, contrasts sharply with the elastic, flexible cross-linked compositions described in the prior art (for example, in U.S. Patent 3,142,657) and prepared by re-reacting together directly a polyol, an anhydride, and a polyepoxide.

The following examples are presented to illustrate, but not to limit, the present invention:

EXAMPLE 1

In a 1-liter, 316 stainless steel pressure vessel equipped with agitation, 75.0 grams of diethylene glycol and 221.9 grams of phthalic anhydride were heated to 220° F., from which point an exotherm carried the temperature to 330° F. The vessel was then allowed to cool slowly for a period of 1 hour. The product was pale amber and had a bulk viscosity of 4.28 million centipoises at 26° C. The product contained a small amount of free phthalic anhydride, and had an acid number of 300.

9.4 grams of the above product, 14.8 grams of bisphenol A-diglycidyl ether (Epon 826), and 2 drops of stabilized stannous octoate were mixed and heated at 125° C. for 6 hours. The resulting casting had a Shore A hardness of 55–60 at 125° C. and a one-minute Shore A hardness of greater than 99 at room temperature.

EXAMPLE 2

In a 1-liter 316 stainless steel pressure vessel equipped with agitation, 99.9 grams of polyoxyethylene glycol having an average molecular weight of 200 and 158.5 grams of phthalic anhydride were heated at 260–305° F. for 1 hour and 10 minutes. The product was amber and had a bulk viscosity of 530,000 centipoises at 25° C. Some free phthalic anhydride was present, and the acid number was 248.

8.85 grams of the above product, 11.05 grams of bisphenol A-diglycidyl ether, and 2 drops of stannous octoate were mixed and heated at 125° C. for 6 hours. The resulting casting had a Shore A hardness of 55–60 at 125° C. and a one-minute Shore A hardness of greater than 99 at room temperature.

EXAMPLE 3

In a 1-liter 316 stainless steel pressure vessel equipped with agitation, 255.5 grams of polyoxyethylene glycol having an average molecular weight of 300 and 266.8 grams of phthalic anhydride were heated at 240–280° F. for 3 hours. The product was pale amber and had a viscosity of 130,000 centipoises at 22° C. Some free anhydride was present, and the acid number was 204.

9.25 grams of the above product, 9.65 grams of bisphenol A-diglycidyl ether, and 3 drops of stannous octoate were mixed and heated at 125° C. for 5½ hours. The resulting casting had a Shore A hardness of about 60 at 125° C. and had a one-minute Shore A hardness of 97–98 at room temperature.

EXAMPLE 4

In a 1-liter 316 stainless steel pressure vessel equipped with agitation, 254.1 grams of polyoxyethylene glycol having an average molecular weight of about 400 and 196.2 grams of phthalic anhydride were heated at 260–300° F. for 2½ hours. The product was almost colorless and had a viscosity of 29,400 centipoises at 24° C. Some free anhydride was present and the acid number was 172.

11.95 grams of the above product, 10.7 grams of bisphenol A-diglycidyl ether, and 3 drops of stannous octoate were mixed and heated at 125° C. for 4½ hours. The resulting casting had a Shore A hardness of 60–65 at 125° C. and one-minute Shore A hardness of 72 at room temperature.

EXAMPLE 5

In a 1-liter 316 stainless steel pressure vessle equipped with agitation, 236.9 grams of polyoxyethylene glycol having an average molecular weight of about 600 and 123.4 grams of phthalic anhydride were heated at 240–280° F. for 2½ hours. The product was almost colorless and had a viscosity of 10,900 centipoises at 22° C. Some free anhydride was present and the acid number was 137.

11.4 grams of the above product, 8.8 grams of bisphenol A-diglycidyl ether and 3 drops of stannous octoate were mixed and heated at 125° C. for 5½ hours. The resulting casting had a Shore A hardness of 50–56 at 125° C. and was soft and elastic at room temperature with a 1-minute Shore A hardness of 58.

EXAMPLE 6

In a 1-liter 316 stainless steel pressure vessel equipped with agitation, 229.1 grams of polyoxypropylene glycol having an average molecular weight of about 400 and 160.0 grams of phthalic anhydride were heated at 240–280° F. for 5½ hours. The product was yellow and had a viscosity of 143,000 centipoises at 23° C.

12.05 grams of the above product, 10.15 grams of bisphenol A-diglycidyl ether and 4 drops of stannous octoate were mixed and heated at 125° C. for 5 hours. The resulting casting had a Shore A hardness of 55–60 at 125° C. and a one-minute Shore A hardness of 89 at room temperature.

EXAMPLE 7

In a 1-liter 316 stainless steel pressure vessel equipped with agitation, 211.1 grams of polyoxypropylene glycol of 760 mol. wt. and 86.1 grams of phthalic anhydride were heated at 260–280° F. for 5½ hours. The product was yellow and had a viscosity of 19,000 centipoises at 24° C.

14.9 grams of the above product, 9.4 grams of bisphenol A-diglycidyl ether and 4 drops of stannous octoate were mixed and heated at 125° C. for 4 hours. The resulting casting had a Shore A hardness of 48 at 125° C. and a 1-minute Shore A hardness of 50 at room temperature.

EXAMPLE 8

13.1 grams of chlorendic anhydride were mixed and heated with 12.2 grams of polyoxypropylene glycol of 760 mol. wt. at 140° C. for 1 hour and 10 minutes. The resulting polymer had a viscosity of about 100,000 centipoises at 25° C.

15.05 grams of the resulting product were mixed with 6.05 grams of bisphenol A-diglycidyl ether and heated at 125° C. for 24 hours. The resulting casting had a Shore A hardness of 41 at 125° C. and a one-minute Shore A hardness of 51 at room temperature.

EXAMPLE 9

In a 1-liter 316 stainless steel pressure vessel equipped with agitation, 265.0 grams of tetrachlorophthalic anhydride and 179.7 grams of polyoxyethylene glycol of about 400 molecular weight were heated at 260–280° F. for 3 hours. The product was very pale yellow and had a viscosity of 1.32 million centipoises at 24½° C.

12.7 grams of the above product, 7.4 grams of bisphenol A-diglycidyl ether and 4 drops of stannous octoate were mixed and heated at 125° C. for 2 hours. The resulting casting had a Shore A hardness of 59 at 125° C. and a one-minute Shore A hardness of 94 at room temperature.

EXAMPLE 10

In a 1-liter 316 stainless steel pressure vessel equipped with agitation, 234.1 grams of an oxypropylene adduct of trimethylolpropane having an equivalent weight of 142 and 260.3 grams of phthalic anhydride were heated at 260°–280° F. for 6 hours. The product was dark and had a viscosity in excess of 8,000,000 centipoises at 25° C., but was not glassy or brittle.

EXAMPLE 11

In a 1-liter 316 stainless steel pressure vessel equipped with agitation, 139.3 grams of diethylene glycol and 270.5 grams of maleic anhydride were heated at 240–280° F. for 3½ hours. The product was pale amber and had a viscosity of 48,000 centipoises at 21° C.

EXAMPLE 12

In a 1-liter 316 stainless steel pressure vessel equipped with agitation, 258.7 grams of triethylene glycol and 354.3 grams of maleic anhydride were heated at 260–280° F. for 1 hour. The product was amber and had a viscosity of 20,800 centipoises at 24½° C.

9.3 grams of the above product, 16.0 grams of the diglycidyl ether of bisphenol A, and 5 drops of stannous octoate were heated at 125° C. for 2½ hours. The resulting casting had a Shore A hardness of 70–72 at 125° C. and a one-minute Shore A hardness of 98 at room temperature.

EXAMPLE 13

In a 1-liter 316 stainless steel autoclave equipped with agitation, 248.1 grams of tetraethylene glycol and 254.3 grams of maleic anhydride were heated at 260–280° F. for 3½ hours. The resulting product had a viscosity of 22,800 centipoises at 21° C.

8.3 grams of the above product, 11.9 grams of bisphenol A-diglycidyl ether and 3 drops of stannouc octoate were heated at 125° C. for 1 hour and 30 minutes. The resulting casting had a Shore A hardness of 71 at 125° C. and a one-minute Shore A hardness of 98 at room temperature.

EXAMPLE 14

In a 1-liter 316 stainless steel autoclave equipped with agitation, 246.7 grams of polyoxyethylene glycol of about 300 molecular weight and 164.6 grams of maleic anhydride were heated at 260–280° F. for 1½ hours. The product was amber and had a viscosity of 10,000 centipoises at 23½° C.

10.5 grams of the above product, 12.1 grams of bisphenol A-diglycidyl ether and 5 drops of stannous octoate were heated at 125° C. for 1 hour and 45 minutes. The resulting casting had a Shore A hardness of 65 at 125° C. and a 1-minute Shore A hardness of 68 at room temperature.

EXAMPLE 15

52.2 grams of the carboxyl-terminated polyether of Example 3 and 19.9 grams of chlorendic anhydride were heated together with stirring until a clear solution resulted. The solution remained clear after cooling to room temperature, and had a viscosity of 1.1 million centipoises at 22½° C.

Then 10.05 grams of additional chlorendic anhydride was added and the mixture again heated to effect solution. Again the solution remained homogeneous on standing at room temperature, and the viscosity was 1.5 million centipoises at 22½° C.

EXAMPLE 16

53.2 grams of the acidic polymer of Example 3 and 7.3 grams of maleic anhydride were heated to effect solution. The solution remained clear on cooling to room temperature, and had a viscosity of 8,000 centipoises at 29° C.

Then 11.7 grams of additional maleic anhydride were added and the mixture again heated to solution. The solution remained clear after cooling to room temperature, and had a viscosity of approximately 1000 centipoises at room temperature.

EXAMPLE 17

56.8 grams of the carboxyl-terminated polyether of Example 3 and 8.8 grams of phthalic anhydride were heated together with stirring at 125° C. The phthalic anhydride dissolved slowly, and began to reprecipitate quickly on cooling. After standing overnight, there was a considerable precipitate of phthalic anhydride.

EXAMPLE 18

61.1 grams of the acidic polymer of Example 3 and 10.0 grams of succinic anhydride were heated together with stirring at 125° C. The succinic anhydride dissolved slowly and began reprecipitating quickly on cooling. After standing overnight at room temperature, a large amount of fine crystals had deposited.

EXAMPLE 19

50.3 grams of the carboxyl-terminated polyether of Example 3 and 9.0 grams of tetrachlorophthalic anhydride were heated with stirring at 125° C. Only partial solution was obtained in 1½ hours, but there appeared to be no reprecipitation of the dissolved anhydride on cooling and standing. The resulting solution had increased viscosity over the component polymer alone.

A similar result was achieved using tetrabromophthalic anhydride in place of the tetrachlorophthalic anhydride.

EXAMPLE 20

55.2 grams of the carboxyl-terminated polyether of Example 4 and 16.5 grams of chlorendic anhydride were heated to solution. Then 11.6 grams of this solution, 10.7 grams of bisphenol A-diglycidyl ether, and 2 drops of stannous octoate were heated at 125° C. for 4½ hours. The resulting casting had a Shore A hardness of 70 at 125° C. and a one-minute Shore A hardness of 97–98 at room temperature.

EXAMPLE 21

52.6 grams of the acidic polymer of Example 4 and 9.4 grams of maleic anhydride were heated to solution. Then 10.5 grams of the solution, 10.35 grams of bisphenol A-diglycidyl ether and 2 drops of stannous octoate were heated at 125° C. for 4¼ hours. The resulting casting had a Shore A hardness of 74 at 125° C. and a one-minute Shore A hardness of 97–98 at room temperature.

EXAMPLE 22

A polyester-ether copolymer was prepared by reacting 93.4 grams of dipropylene glycol, 227.4 grams of phthalic anhydride, and 143.1 grams of propylene oxide at 120–140° C. for 1½ hours. The resulting product was very pale in color and had a viscosity of 275,000 centipoises at 25½° C.

66.1 grams of this polymer and 19.2 grams of maleic anhydride were heated and mixed together. The resulting solution had a viscosity of 10,000 centipoises at 25° C.

EXAMPLE 23

47.9 grams of dipropylene glycol, 264.9 grams of chlorendic anhydride, and 83.4 grams of propylene oxide were heated at 70–95° C. for 1¼ hours. The polyester-ether copolymer product was pale olive in color and was glassy at room temperature.

80.1 grams of this polymer and 19.2 grams of maleic anhydride were heated and mixed together. The resulting solution had a viscosity of 140,000 centipoises at 27° C.

EXAMPLE 24

Phthalic anhydride, 201.4 grams, and 147.9 grams of glycerol-propylene oxide adduct of 100 equivalent weight, were reacted at about 200° C. for 2 hours with a nitrogen purge. The resulting amber product was a hard glass at room temperature.

57.1 grams of this polyester was heated and mixed with 25.6 grams of maleic anhydride. The resulting mixture had a viscosity of 1,600 centipoises at 40° C.

EXAMPLE 25

A polyester-ether copolymer was prepared by heating 70.4 grams of glycerol, 403.6 grams of phthalic anhydride, 311.1 grams of propylene oxide and 0.45 grams of stabilized stannous octoate in a sealed, stirred autoclave at 100–140° C. for 1 hour. The product was nearly colorless and had a viscosity of 2.2 million centipoises at 26° C.

67.7 grams of this ester were heated and mixed with 14.0 grams of maleic anhydride. The resulting solution had a viscosity of about 200,000 centipoises at 25° C.

I claim:

1. A homogeneous composition comprising (1) from 25 to 98 percent by weight of a carboxylic-acid-terminated polymer having a carboxylic acid functionality of from two to four and an equivalent weight of from about 130 to 1000, and being selected from the group consisting of carboxylic-acid-terminated polyesters, polyethers, and polyester-ethers, and (2) from 2 to 75 percent by weight of maleic anhydride, said composition having a viscosity of less than 500,000 centipoises at 25° C.

2. A composition according to claim 1 in which the carboxylic-acid-terminated polymer has the general formula:

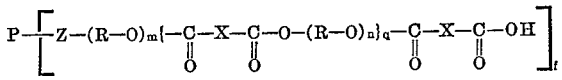

wherein Z is an atom selected from the group consisting of oxygen and sulfur, $f$ is the functionality and has a value varying from two to four, P is identical with the residue P in a polymerization starter $P(ZH)_f$ selected from the group consisting of water, hydrogen sulfide, and organic compounds with from two to four active-hydrogen-containing radicals of the group consisting of hydroxyl radicals, carboxylic acid radicals and sulfhydryl radicals, X is a hydrocarbon radical selected from the group consisting of 1,2-ethenylene, 1,2-phenylene, 3,4,5,6-tetrahydro-1,2-phenylene, 3,4,5,6-tetrachloro-1,2-phenylene, 3,4,5,6-tetrabromo-1,2-phenylene, and 1,4,5,6,7,7-hexachloro-(2,2,1)-bicyclo-2,3-heptenylene-5, R is a lower aliphatic 1,2-alkylene radical, $m$ is an integer with a value varying from zero to about ten, $n$ is an integer having a value of at least one with the average value of $n$ ranging from about 1.5 to about 3.0, and $q$ is an integer having a value of from zero to about 5.

3. A composition according to claim 1 in which the carboxylic-acid-terminated polymer has the general formula:

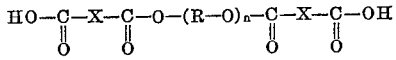

wherein X is a hydrocarbon radical selected from the group consisting of 1,2-ethenylene, 1,2-phenylene, 3,4,5,6-tetrahydro-1,2-phenylene, 3,4,5,6-tetrachloro-1,2-phenylene, 3,4,5,6-tetrabromo-1,2-phenylene and 1,4,5,6,7,7-hexachloro-(2,2,1)-bicyclo-2,3-heptenylene-5, R is a 1,2-alkylene radical selected from the group consisting of 1,2-ethylene, 1,2-propylene, and 1,2-butylene, and $n$ is an integer having a value of at least one.

4. The composition according to claim 1 which contains from five to fifty percent by weight, based on the total weight, of an anhydride selected from the group consisting of chlorendic anhydride, monochloromaleic anhydride, and dichloromaleic anhydride.

5. The composition according to claim 1 which contains from one to ten percent by weight, based on the weight of the total composition, of an anhydride selected from the group consisting of phthalic anhydride, tetrahydrophthalic anhydride, tetrachlorophthalic anhydride, and tetrabromophthalic anhydride.

6. A fluid epoxy curing agent comprising the composition of matter of claim 1.

7. A fluid epoxy curing agent comprising the composition of matter of claim 2.

8. A fluid epoxy curing agent comprising the composition of matter of claim 3.

9. The process of preparing a homogeneous fluid composition which comprises (A) intimately admixing (1) from 25 to 98 percent by weight of a carboxylic-acid-terminated polymer having a carboxylic acid functionality of from two to four and an equivalent weight of from about 130 to 1000, and being selected from the group consisting of carboxylic-acid-terminated polyesters, polyethers, and polyester-ethers, with (2) from 2 to 75 percent by weight of maleic anhydride, and (B) heating said intimate admixture with agitation until a clear, homogeneous composition is obtained and (C) cooling said composition to room temperature.

References Cited
UNITED STATES PATENTS

| | | | |
|---|---|---|---|
| 2,947,717 | 8/1960 | Belanger et al. | 260—45.4 |
| 3,280,077 | 10/1966 | Case et al. | 260—75 |

JOSEPH L. SCHOFER, *Primary Examiner.*

C. A. HENDERSON, JR., *Assistant Examiner.*

U.S. Cl. X.R.

260—2, 75, 78.4, 485